(No Model.)

J. B. BURKE & J. F. BADGER.
COMBINED PLANTER AND CULTIVATOR.

No. 493,063. Patented Mar. 7, 1893.

WITNESSES:
Fred G. Dietrich
M. D. Blondel

INVENTORS:
J. B. Burke.
J. F. Badger.
BY Munn & Co.
ATTORNEYS

UNITED STATES PATENT OFFICE.

JOHN B. BURKE AND JOHN F. BADGER, OF QUITMAN, GEORGIA.

COMBINED PLANTER AND CULTIVATOR.

SPECIFICATION forming part of Letters Patent No. 493,063, dated March 7, 1893.

Application filed August 5, 1892. Serial No. 442,285. (No model.)

*To all whom it may concern:*

Be it known that we, JOHN B. BURKE and JOHN F. BADGER, residing at Quitman, in the county of Brooks and State of Georgia, have invented certain new and useful Improvements in a Combined and Convertible Planter and Cultivator, of which the following is a specification.

Figure 1:
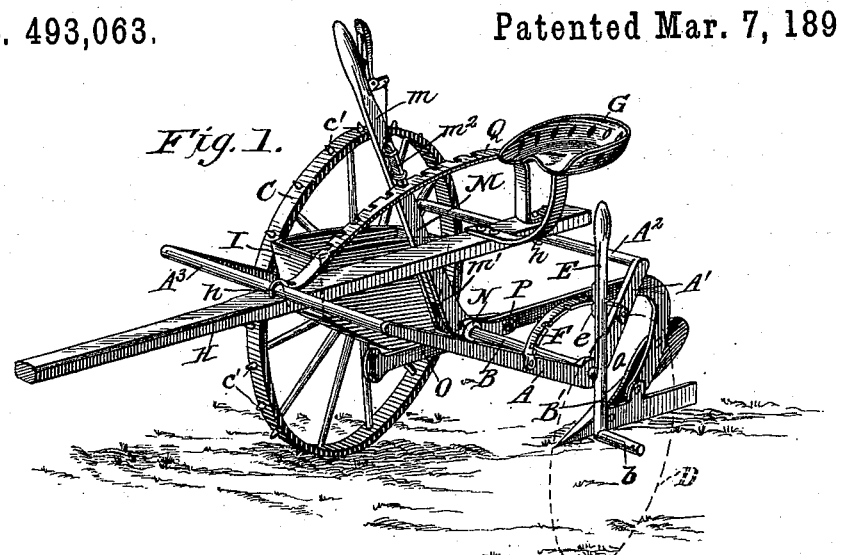
Figure 2:
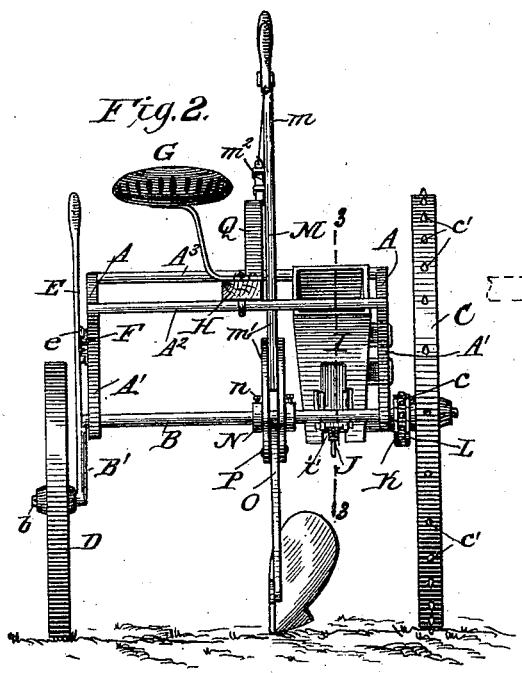
Figure 3:
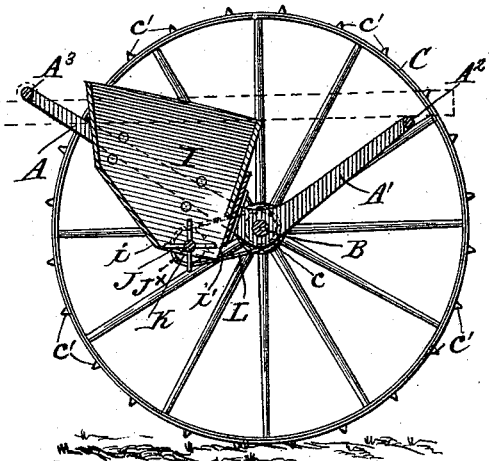
Figure 4:
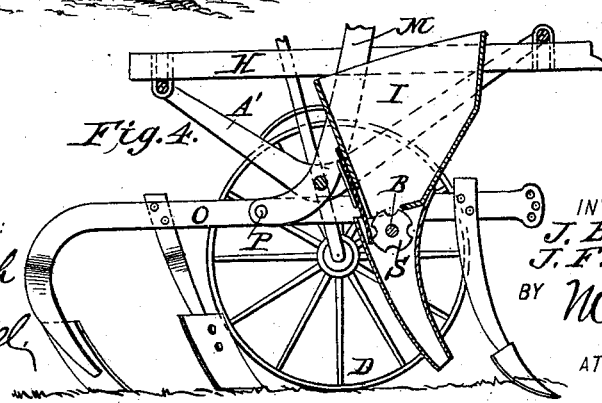

Our invention relates to grain sowing cultivators and it has for its object to provide a machine of this character which will embody the elements of simplicity, ease of operation and adjustment, cheapness in construction and general durability and it consists in the peculiar combination and novel arrangement of parts all of which will hereinafter be fully described in the specification and pointed out in the claims reference being had to the accompanying drawings in which Figure 1 is a perspective view of our improved cultivator and planter. Fig. 2 is a rear view thereof. Fig. 3 is a longitudinal section of the same on the line 3—3 in Fig. 2 and Fig. 4 is a similar view illustrating our machine especially adapted for planting corn.

In the practical construction of our improved machine we employ a main frame formed of the parallel side bars A A, having upward right angular extensions A' A', at their rear ends, which are connected at the upper ends by the cross bar A², the front ends of such side bars being joined by the transverse bar A³ as shown, such frame forming the supporting frame upon which the seed dropping devices presently referred to are mounted.

B indicates the axle bar which is loosely mounted in the bent ends $a$ of the main frame, upon one end of which is journaled a large drive wheel C, having a sprocket member $c$ on its inner hub portion, and a series of spikes $c'$ screwed into the tire, for preventing slipping on hilly land. The opposite end of the axle B is formed with a crank member B' having a stub portion $b$ upon which is mounted a smaller and what we term the adjusting wheel D, as by its adjustment relatively to the large wheel the depth of penetration of the plow or plows is determined.

E indicates the adjusting lever, formed of spring metal and secured to the crank member B', its upper or handle portion being formed with the usual detent $e$, which is arranged to engage a segmental rack bar F secured upon the main frame, adjacent the crank end of the axle as shown.

The seat G which is disposed within convenient reach of the lever E, is mounted upon the tongue beam H, which is adjustably mounted on the main frame and axle, preferably by the clip members $h$ $h$ as shown, whereby the said tongue can be moved transversely to any desired position.

I indicates the seed box, secured to beam A of the main frame, adjacent the large wheel, such box which is hopper shaped having a stirrer wheel J journaled in the lower end thereof, such end being closed up to such wheel at its front side as at $i$ while its rear side has an opening $i'$ through which the seed is discharged and which may in practice have the usual cut off slide whereby the size of such opening may be increased or reduced as desired.

Upon the outer end of the stirrer shaft $J^x$ is fixed a sprocket wheel K which is driven by the sprocket chain L geared with the sprocket member $c$ on the large drive wheel.

M indicates the plow lever formed of the upper extension or handle $m$ and a lower bifurcated portion $m'$, loosely journaled on the axle B, and laterally adjustable thereon, it being held to its adjusted position by collars N N, and set screws $n$ $n$ see Fig. 2.

The lower bifurcated end of the plow lever straddles the plow beam O, and is connected therewith by the pivot bolt P, while the upper end has a detent $m^2$ adapted to engage the restraining arched bar Q on the tongue beam whereby the plow can be held to a desired height, or drawn up out of engagement with the ground during the travel of the machine from one part of the field to the other.

The plow which may be of the ordinary construction as shown has the usual clevis portion at its front end to which may be connected the draft chain or double tree.

It will be understood that while we prefer to arrange the drive wheels of different diameters, it is manifest that they may be of the same size as the plow or plows can be adjusted by the lever and rack bar Q.

When our improved devices are to be used for planting corn, the stirrer is removed and a dropping disk S formed with peripheral pockets inserted, the arrangement of which is most clearly shown in Fig 4 of the drawings. In this construction the cut off slide is preferably formed of a flexible material such as leather, so that both sides of the dropping wheel will be incased, but a yielding contact face presented against the discharging side, during the rotation of the disk S. When used for planting corn, the single plow is removed and an opener plow in advance of the seed dropper, and one or two coverer plows to the rear of such dropper are secured to the beam.

From the foregoing description taken in connection with the drawings the advantages and operation will be apparent. It will be noticed that in hilly ground the operator by adjusting the lever E can adjust the main frame and plow to the desired height, by changing the pitch of the crank member of the axle.

By connecting the plow beam as stated the same can be quickly and effectively adjusted upon the axle and the plows elevated or depressed as desired.

Finally by constructing the several parts as shown the entire machine will be of a compact form, can be readily manufactured at a minimum cost, be of great strength and yet of very light weight.

Having thus described our invention, what we claim, and desire to secure by Letters Patent, is—

1. An improved planter and cultivator comprising a main frame, a drive axle loosely mounted in the rear end thereof, the drive wheels loosely journaled on such axle, seed dropping devices mounted on the main frame, a tongue beam laterally adjustable on the axle and main frame, a plow lever laterally adjustable on the axle a plow pivotally supported on the lower end of such lever, the arched restraining bar on the tongue beam, a detent on the plow lever adapted to engage such bar, and mechanism driven by the drive wheel for operating the seed dropping devices, all substantially as and for the purposes described.

2. In a planter and cultivator, the combination with the main frame formed of the side bars A A the angular uprights $A^2$ and the cross-bars $A^3$, and the seed box mounted thereon, dropping devices mounted therein, of the axle B loosely mounted in the rear end of the bars A, said axle having a crank member $B'$, a wheel mounted on such crank end, a large drive wheel on the opposite end of such axle, a rack bar on the main frame, a lever on the crank axle, adapted to engage such bar, the tongue beam, laterally movable on the axle and front cross bar of the main frame, the seat mounted thereon, the laterally movable plow lever M for adjusting it and the drive mechanism for operating the dropping devices, geared with the large drive wheel, substantially as and for the purpose described.

3. In a planter and cultivator essentially as described, a main supporting frame, the seed dropping devices mounted thereon, in combination with a drive axle, loosely mounted in such frame, said axle having a crank member at one end, a wheel journaled on such crank member, a larger wheel journaled on the opposite end of such axle, a rack bar on the main frame and a spring lever on the crank axle adapted to engage said rack bar all substantially as and for the purpose described.

JOHN B. BURKE.
JOHN F. BADGER.

Witnesses:
N. E. HARRELL,
M. BAUM.